United States Patent [19]
Sakakibara et al.

[11] 4,292,060
[45] Sep. 29, 1981

[54] AIR-FILTER ASSEMBLY

[75] Inventors: Naoji Sakakibara, Chiryu; Nobuyuki Hashimoto, Toyota, both of Japan

[73] Assignee: Aisin Sieki Kabushiki Kaisha, Kariya, Japan

[21] Appl. No.: 124,357

[22] Filed: Feb. 25, 1980

Related U.S. Application Data

[63] Continuation of Ser. No. 2,176, Jan. 9, 1979, abandoned.

[30] Foreign Application Priority Data

Jan. 17, 1978 [JP] Japan .................... 53-3638

[51] Int. Cl.³ .................... B01D 50/00; B01D 46/10
[52] U.S. Cl. .................... 55/385 R; 55/503; 55/507; 55/509; 55/501
[58] Field of Search .................... 55/385 R, 490, 492, 55/503, 507, 509, 510, 501; 210/232; 137/549; 285/319, DIG. 22

[56] References Cited
U.S. PATENT DOCUMENTS

| 3,494,111 | 2/1970 | Hathaway | 55/510 |
| 3,595,398 | 7/1971 | Cook | 210/232 |
| 3,712,033 | 1/1973 | Gronholz | 55/509 |
| 3,846,518 | 11/1974 | McPhee | 285/DIG. 22 |
| 4,014,796 | 3/1977 | Sogiyama et al. | 210/437 |
| 4,063,913 | 12/1977 | Kippel et al. | 55/503 |
| 4,107,043 | 8/1978 | McKinney | 210/232 |
| 4,130,405 | 12/1978 | Akado et al. | 55/503 |

FOREIGN PATENT DOCUMENTS 2611233  9/1977  Fed. Rep. of Germany ... 285/DIG. 22
 464623 12/1968  Switzerland ............. 285/DIG. 22

Primary Examiner—David L. Lacey
Attorney, Agent, or Firm—Oblon, Fisher, Spivak, McClelland & Maier

[57] ABSTRACT

An air-filter assembly having a filter cap and a filter case, both being made of elastic material such as synthetic rubber and which are formed integrally with each other. The air filter assembly is provided at an air inlet pipe portion of a valve for use in an exhaust gas emission cleaning system.

1 Claim, 5 Drawing Figures

AIR-FILTER ASSEMBLY

This is a continuation of application Ser. No. 2,176, filed Jan. 9, 1979, now abandoned.

BACKGROUND OF THE INVENTION

1. Field of the Invention

This invention relates to an air filter assembly and, more particularly to an air filter assembly which is provided, for example, at an air inlet portion of a valve for use in an exhaust emission cleaning system.

2. Description of the Prior Art

In conventional exhaust gas emission systems, a vacuum switching valve, a vacuum control valve and other related valves are utilized. One or more of these valves are known as air-breathing type valves. The air-breathing type valve is designed to let air be introduced therein simultaneously with the valve opening thereof for alternating signal pressure.

In order to let air be introduced into the air-breathing type valve, a hose connected with an air-cleaner is frequently used with the result of the entire exhaust emission system being complicated in construction.

For this reason, recent vacuum switching valves, vacuum control valves and other related valves are provided with an air inlet port to let air be introduced therein at the housing thereof with the air filter being incorporated in the housing.

Therefore, the valves cannot be simple in construction and it is not easy to incorporate an air filter into the housing or to replace or change the air filter.

In consideration of the above-noted circumstances, there has been provided an air filter assembly which can be provided at an air inlet pipe portion for connecting with the housing in a single action.

However, the conventional air filter cases of this type have drawbacks in assembly thereof and replacing the air filter because the filter case and filter cap are separately formed.

SUMMARY OF THE INVENTION

It is therefore an object of this invention to provide an improved air filter assembly which will overcome the above-mentioned conventional drawbacks.

Another object of this invention is to provide an air filter assembly having a filter case and a filter cap both of which are formed integrally with each other by using a pair of dies.

According to this invention, an air filter assembly can be easily assembled by coupling a filter case with a filter cap and can be provided by a single action to an air inlet pipe portion of a valve such as a vacuum control valve, vacuum switching valve or other similar valves.

BRIEF DESCRIPTION OF THE DRAWINGS

Various other objects, features and attendant advantages of the present invention will be more fully appreciated as the same become better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
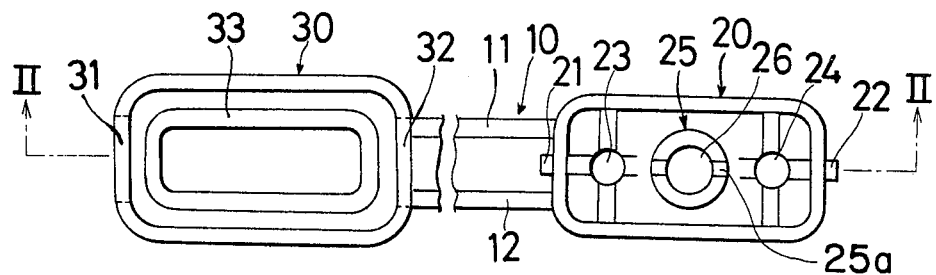
FIG. 1 is a plan view of an air filter assembly in accordance with this invention.
Figure 2:
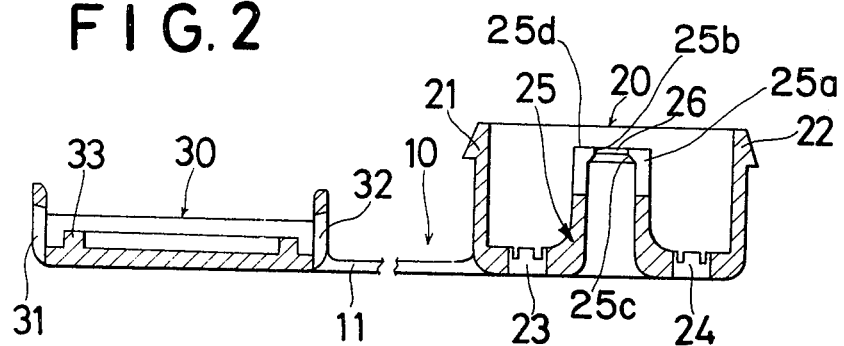
FIG. 2 is a sectional view taken along the line II—II of FIG. 1.

Referring now to FIGS. 1 and 2, an air filter assembly 10 has a filter case 20 in which an air filter (not shown) is incorporated and a filter cap 30 which is coupled with the filter case 20 to hold the air filter in the filter case 20. The air filter case assembly also has two flexible connecting members 11, 12 by which the filter case 20 and the filter cap 30 are connected with each other. The filter case 20, the filter cap 30 and the connecting members 11, 12 are made of elastic material such as synthetic rubber and are formed integrally with each other by using a pair of dies.

The filter case 20 has an upper opening which is provided with two projections 21, 22 at the outer periphery thereof with the two projections 21, 22 being engageable with the filter cap 30. At the bottom of the filter case 20, there are provided two air-inlet ports 23, 24 and an annular projection 25. The annular projection 25 is extended in an upper direction from the central portion of the bottom of the filter case 20, and is provided with a communicating hole 26 at the upper end thereof.

The filter cap 30 has two holes 31, 32 which are provided at the outer periphery thereof and which are engageable with the projections 21, 22, respectively. The filter cap 30 also is provided with a rib 33 which is of a substantially similar shape to the periphery thereof but of a smaller size than the periphery thereof. Air-inlet ports 23', 24' may alternately be provided in filter cap 30.

Figure 3:
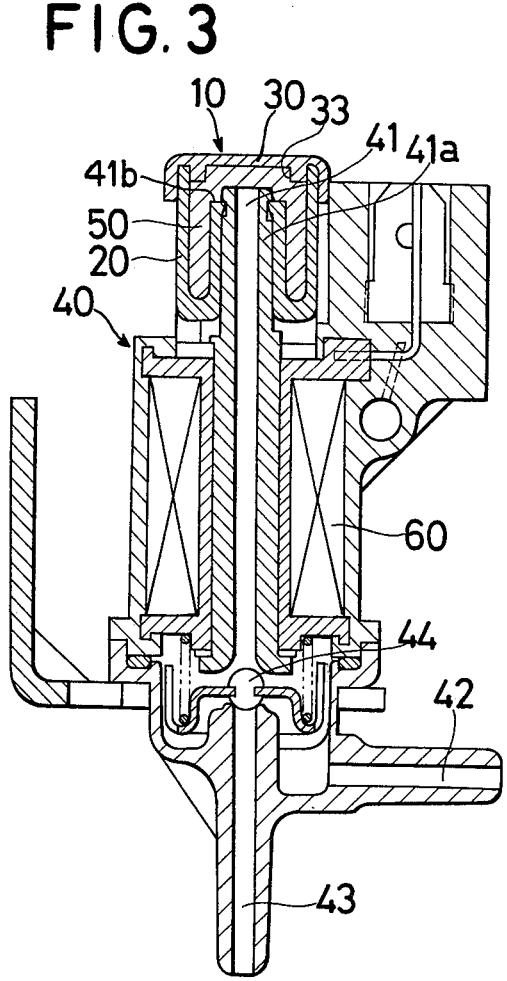
FIG. 3 is a cross-sectional view of a vacuum switching valve provided with an air filter assembly in accordance with this invention.

Referring to FIG. 3, illustrated therein is the air filter case assembly 10 which is formed with the filter case 20 and the filter cap 30 by engaging the projections 22, 21 with the holes 31, 32, respectively. The air filter assembly 10 is connected to a solenoid-operated control valve 40 and an air filter 50 held by the rib 33.

The control valve 40 has a first inlet port 41 through which air is guided, a second inlet port 43 connected with a vacuum source (not shown) and an outlet port 42. A pipe portion 41a at which the first inlet port 41 is provided is inserted in the inner portion of the annular projection 25 whereby the air filter assembly 10 is fixed to the control valve 40.

Projection 25 of the case 20 includes recess 25a, inner, small diameter portion 25b, conical surface 25c and flat surfaced, transverse groove 25d. Pipe portion 41a having first inlet port 41 includes groove 41b. The above features facilitate the assembly of an air filter onto the control valve 40, that is:

1. upper portion of projection 25 will be easily disposed into the projection 25;

2. the pipe portion 41a is guided by the conical surface 25c of the projection 25 upon insertion;

3. outer peripheral groove 41b of the pipe portion 41a receives the small diameter portion 25b of the projection to firmly engage with each other; and 4. once the assembling has been completed, the filter assembly will not be loosened due to the provision of flat surfaces, transverse groove 25d.

Figure 4:
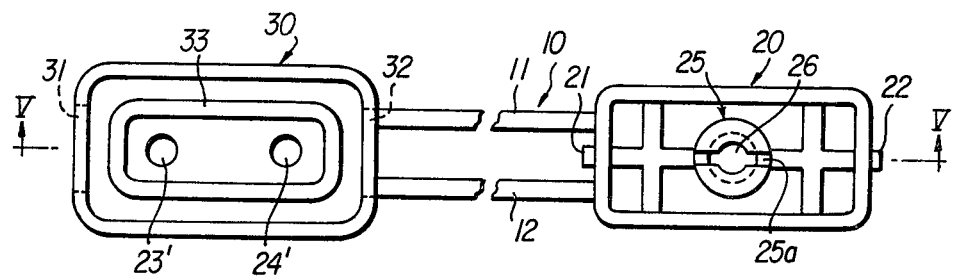
FIG. 4 is a plan view of an air assembly in accordance with an alternate embodiment of this invention.
Figure 5:
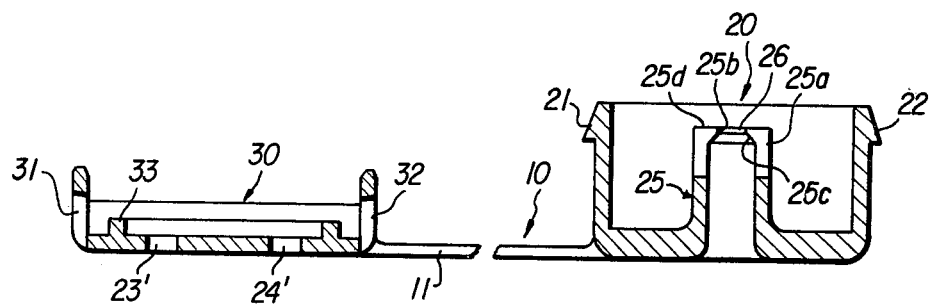
FIG. 5 is a sectional view taken along line V—V of FIG. 4.

In FIG. 3, the outlet port 42 is in communication with atmospheric air through the air inlet ports 23, 24, the air filter 50 and the first inlet port 41. However, when a solenoid 60 is energized and valve 44 is lifted, the outlet port 42 is brought into communication with a vacuum source through the second inlet port 43. FIGS. 4 and 5 illustrate air-inlet ports 23' and 24' formed in filter cap 30 on opposite sides of the cap and which communicate with hole 26.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An air filter assembly for connecting to a pipe member of a control valve of an exhaust emission cleaning system, comprising:
   a filter case having an air filter therein and having a communicating hole connected to said pipe member;
   a filter cap coupled with said filter case, wherein said filter case and said filter cap are made of elastic material and formed integrally with each other via at least one connecting member;
   a projection vertically extending from the bottom of said filter case wherein said communicating hole comprises an inner, small diameter opening provided at the top of said projection, said projection including an inner conical surface portion connected to said small diameter opening, at least one longitudinal recess extending from the top of said projection towards said bottom of said filter case, and a transverse groove formed in said projection and cooperable with said pipe member so as to facilitate connection of said filter case to said pipe member;
   air inlet means formed in either said filter case or said filter cap on opposite side portions of said projection;
   projecting means provided on said filter case wherein said filter cap is coupled with said filter case by connection with said projecting means;
   at least one connecting member, including an aperture for said projecting means, formed integrally with said filter case and said filter cap wherein said filter case is coupled to said cap by said at least one connecting member; and
   a rib portion provided on said filter cap to hold said air filter, whereby said air filter can be simply and quickly assembled and replaced.

* * * * *